United States Patent
Arshad et al.

(10) Patent No.: US 10,805,785 B2
(45) Date of Patent: Oct. 13, 2020

(54) METHODS, CORE NETWORK NODE AND RAN NODE FOR ENABLING EMERGENCY SERVICES

(71) Applicant: Telefonaktiebolaget LM Ericsson (publ), Stockholm (SE)

(72) Inventors: Malik Wahaj Arshad, Upplands Väsby (SE); Angelo Centonza, Stockholm (SE); Gunnar Mildh, Sollentuna (SE); Paul Schliwa-Bertling, Ljungsbro (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/340,743

(22) PCT Filed: Jan. 9, 2019

(86) PCT No.: PCT/SE2019/050010
§ 371 (c)(1),
(2) Date: Apr. 10, 2019

(87) PCT Pub. No.: WO2019/147176
PCT Pub. Date: Aug. 1, 2019

(65) Prior Publication Data
US 2020/0120470 A1 Apr. 16, 2020

Related U.S. Application Data

(60) Provisional application No. 62/620,523, filed on Jan. 23, 2018.

(51) Int. Cl.
*H04M 11/04* (2006.01)
*H04W 4/90* (2018.01)
(Continued)

(52) U.S. Cl.
CPC ............ *H04W 4/90* (2018.02); *H04W 8/065* (2013.01); *H04W 36/0022* (2013.01)

(58) Field of Classification Search
None
See application file for complete search history.

(56) References Cited

U.S. PATENT DOCUMENTS

| 2014/0169269 A1* | 6/2014 | Salot | H04W 76/10 |
| | | | 370/328 |
| 2014/0349604 A1* | 11/2014 | Xu | H04W 60/04 |
| | | | 455/404.1 |
| 2019/0159074 A1* | 5/2019 | Velev | H04W 76/27 |

FOREIGN PATENT DOCUMENTS

EP 2747376 A1 6/2014

OTHER PUBLICATIONS

Unknown, Author, "Update to Registration Procedure to Generalize Amf Handling of a Registration Associated with any Access Type", SA WG2 Meeting #125, S2-180092, Ericsson, Gothenburg, Sweden, Jan. 22-26, 2018, 10 pages.
(Continued)

*Primary Examiner* — Erika A Washington
(74) *Attorney, Agent, or Firm* — Murphy, Bilak & Homiller, PLLC

(57) ABSTRACT

Methods, a core network node (104A) and a node (102A) in a radio access network, RAN, (102), for enabling emergency services for wireless devices in the RAN. The core network node (104A) sends (2:1), to the RAN node (102A), information about one or more Access and Mobility Management Functions, AMFs, that support emergency services, to avoid an emergency fallback procedure for wireless devices in the RAN. The RAN node (102A) then selects (2:2) an AMF (104B) that supports emergency services for a wireless device (100) in the RAN, based on the received information. Thereby, the wireless device will have immediate access to
(Continued)

emergency services and no delaying emergency fallback procedure is performed which could be critical in an emergency situation.

16 Claims, 3 Drawing Sheets

(51) Int. Cl.
 *H04W 8/06* (2009.01)
 *H04W 36/00* (2009.01)

(56) References Cited

OTHER PUBLICATIONS

Unknown, Author, "Fixes for Emergency Services and Emergency Services Using Fallback", SA WG2 Meeting #125, S2-180467, Nokia, Nokia Shanghai Bell, Goethenburg, Sweden, Jan. 22-26, 2018, 6 pages.

3GPP, "3rd Generation Partnership Project; Technical Specification Group Radio Access Network; Evolved Universal Terrestrial Radio Access (E-UTRA); User Equipment (UE) procedures in idle mode (Release 14)", 3GPP TS 36.304 V14.3.0, Jun. 2017, 1-49.

3GPP, "3rd Generation Partnership Project; Technical Specification Group Services and System Aspects; Procedures for the 5G System; Stage 2 (Release 15)", 3GPP TS 23.502 V15.0.0, Dec. 2017, 1-258.

3GPP, "3rd Generation Partnership Project; Technical Specification Group Services and System Aspects; System Architecture for the 5G System; Stage 2 (Release 15)", 3GPP TS 23.501 V15.0.0, Dec. 2017, 1-181.

Unknown, Author, "23.501: OI2a: Emergency Services Fall back", SA WG2 Meeting #124, S2-179595, Reno, Nevada, Nov. 27-Dec. 1, 2017, 1-4.

\* cited by examiner

METHODS, CORE NETWORK NODE AND RAN NODE FOR ENABLING EMERGENCY SERVICES

TECHNICAL FIELD

The present disclosure relates generally to a core network node, a radio access network, RAN, node and methods therein, for enabling emergency services in a radio access network.

BACKGROUND

In this disclosure, the term "wireless device" is sometimes used to represent any communication entity capable of radio communication with a wireless network by sending and receiving radio signals, such as e.g. mobile telephones, tablets, laptop computers and Machine-to-Machine, M2M, devices, also known as Machine Type Communication, MTC, devices. Another common generic term in this field is "User Equipment, UE" which is frequently used herein as a synonym for wireless device.

Further, the term "RAN node", is used herein to represent any node of a radio access network, RAN, that is operative to communicate with wireless devices. The RAN node in this disclosure may refer to a base station, radio node, Node B, eNB, gNB, etc., although this disclosure is not limited to these examples. The term "eNB" is frequently used herein to represent a RAN node.

The core network terminology used herein is defined and explained in a 3GPP document TS 23.501, specifically for Access and Mobility Management Function (AMF), refer to section 6.2.1 of TS 23.501. 3GPP denotes the Third Generation Partnership Project and TS denotes Technical Specification.

The 5G system defined by 3GPP in Release 15 (Rel-15) includes both a new radio access (NR) and a new core network (5GC). The 5GC offers several new features such as support for network slicing, improved Quality of Service QoS, and latency and battery optimizations in the form a new UE state called inactive mode. To be able to provide these features also in LTE and to enable fast mobility between LTE and NR, the radio access nodes in LTE referred to as LTE eNBs, needs to support connectivity to 5GC. Together, LTE eNBs and the radio access nodes in NR referred to as NR gNBs connected to 5GC, make up the next generation radio access network (NG-RAN), see the 3GPP document TS 23.501, "System Architecture for the 5G System", (release 15).

3GPP has decided that a NR and E-UTRA/LTE can provide access to 5GC. It is also agreed that a cell providing access using E-UTRA can provide access via an Evolved Packet Core, EPC, as well as 5GC. This means that such a cell can be serving UEs connected to either of the above two core networks and thus provide the respective services. A CR (Change Request) on Emergency Service Fall back from NR to LTE was approved during SA WG2 Meeting #124, see S2-179595, CR for 3GPP TS 23.501: "Emergency Services Fall back". The support for Emergency services in NR have not yet been defined. SA2 agreed in last working group (WG) meeting that the Access and Mobility Management Function, AMF, sends an Emergency Service Support indicator within the Registration Accept to the UE (valid with in same Reg Area per TA) in case multiple Radio Access Technologies, RAT's, have different support for emergency services.

AMF is a node in the core network with specific functionalities. The main responsibility of AMF is to manage mobility of the UEs between different Radio Access Network/Node (RAN) cells. A UE always camps on a specific AMF and is directed by the RAN node towards that specific AMF which thus will serve the UE, e.g. by providing emergency services.

It is for further study in SA2 to evaluate if the Registration Accept would have RAT specific indicators for support of Emergency services (in case of multiple RAT's). It was also agreed that the indicator for emergency services support would indicate if
- the UE can setup emergency PDU session in the respective RAT, or
- the UE should perform Service Request as per clause 5.16.4.11 of 3GPP TS 23.501

The UE would be able to setup an emergency PDU session in this RAT if the network supports emergency services and if this is indicated in the emergency services support indicator. In case the emergency service support indicator is set to NO, it means the emergency service is not supported and the UE needs to trigger a service request for requesting the network for alternative emergency option which is an emergency fall back.

The UE would only trigger emergency service request if
- the emergency services indicator is included in the Registration Accept message earlier, and
- the network indicates that IMS PS voice is not supported or the emergency service indicator is set to NO.

According to SA2 CR, based on service request from UE with service type set to emergency, the AMF would trigger a so-called "N2 procedure" resulting in either Connected state mobility (involving a Handover procedure) or Idle state mobility (involving a redirection procedure) to either E-UTRA/5GC or to E-UTRAN/EPC. N2 procedures are generally known as such in this field and some N2 procedures are described in the 3GPP document TS 23.502, Rel. 15, see e.g. section 4.2.7.

SUMMARY

It is an object of embodiments described herein to address at least some of the problems and issues outlined above. It is possible to achieve this object and others by using methods, a core network node and a node in a radio access network, RAN, as defined in the attached independent claims.

According to one aspect, a method is performed by a core network node of a core network, for enabling emergency services for wireless devices in a radio access network, RAN. In this method, the core network node sends, to a node in the RAN, information about one or more Access and Mobility Management Functions, AMFs, that support emergency services, to avoid an emergency fallback procedure for wireless devices in the RAN.

According to another aspect, a core network node of a core network is arranged to enable emergency services for wireless devices in a radio access network, RAN.

The network node is configured to send, to a node in the RAN, information about one or more Access and Mobility Management Functions, AMFs, that support emergency services, to avoid an emergency fallback procedure for the wireless devices.

According to another aspect, a method is performed by a node in a radio access network, RAN, for enabling emergency services for wireless devices in the RAN. In this method, the RAN node receives, from a core network node of a core network, information about one or more Access and Mobility Management Functions, AMFs, that support emergency services, to avoid an emergency fallback procedure for the wireless devices. The RAN node then selects an AMF that supports emergency services for a wireless device in the RAN, based on the received information.

According to another aspect, a node in a radio access network, RAN, is arranged to enable emergency services for wireless devices in the RAN. The RAN node is configured to receive, from a core network node of a core network, information about one or more Access and Mobility Management Functions, AMFs, that support emergency services, to avoid an emergency fallback procedure for the wireless devices. The RAN node is further configured to select an AMF that supports emergency services for a wireless device in the RAN, based on the received information.

When employing either of the above methods and nodes, it is an advantage that the RAN node is able to select an AMF that supports emergency services for a wireless device in the RAN, based on the received information about the AMF(s) that support emergency services. Thereby, the wireless device will have access to emergency services and no emergency fallback procedure will be triggered which would otherwise cause considerable delays before any emergency service can be accessed which may be critical in an emergency situation.

The above methods and nodes may be configured and implemented according to different optional embodiments to accomplish further features and benefits, to be described below.

A computer program is also provided comprising instructions which, when executed on at least one processor in either of the above core network node and RAN node, cause the at least one processor to carry out the method described above. A carrier is also provided which contains the above computer program, wherein the carrier is one of an electronic signal, an optical signal, a radio signal, or a computer readable storage medium.

BRIEF DESCRIPTION OF DRAWINGS

The solution will now be described in more detail by means of exemplary embodiments and with reference to the accompanying drawings, in which.

DETAILED DESCRIPTION

Throughout this description, the terms AMF and AMF node are used interchangeably. Some problems that may occur when using conventional procedures will first be identified and discussed.

A problem that has been recognized with the current emergency fall back solution in S2-179595, 3GPP TS 23.501 is that it triggers an emergency fall back even if the serving AMF does not support emergency services, ignoring the case that another AMF could support emergency services within the same core network. Then, there are two potential issues that might arise after the mobility is triggered by RAN for emergency purposes. First, if the target cell supports two core networks and only one of them supports emergency services, there is a chance that the UE might camp on the "wrong" core network not supporting emergency services, and thereby miss emergency services. Due to the typically critical and urgent nature of emergency services, any delay caused by camping on the wrong core network is not acceptable.

Another potential issue with emergency fall back lies in the absence of RAN awareness about whether neighbor cells support emergency services or not. Without this knowledge, RAN would not be able to trigger emergency fall back based mobility procedures towards the "right RAT" that supports emergency services, unless consistent support for emergency services is assumed in the network. Here, RAN refers to Radio Access Network/Node.

For example, the above issues may be addressed by adding core network information in a 'release with redirect' message meant for emergency fall back to make sure that the UE camps on the right core network after a release with redirect procedure. In another example, unnecessary emergency fall backs may be avoided by exchanging information about the support for emergency services between a core node in the core network, a node in the radio access network, i.e. a RAN node such as an eNB, and the UE. Further, the emergency fall back may be optimized for networks with inconsistent support for emergency services by exchanging capabilities about emergency services via X2 signaling or UE based measurements.

Some advantages that can be achieved by implementing the examples and embodiments herein may include the following. In the examples described herein, the UE is able to camp on the right core network to avail emergency service, e.g. after an emergency fall back based release with redirect to a cell supporting multiple core networks. Further, it is possible to avoid unnecessary fall backs to legacy RAT for emergency purposes. Moreover, the examples herein may be employed to handle mobility meant for emergency fall back in case the support for emergency support is not consistent within a UE registration area.

Figure 1:
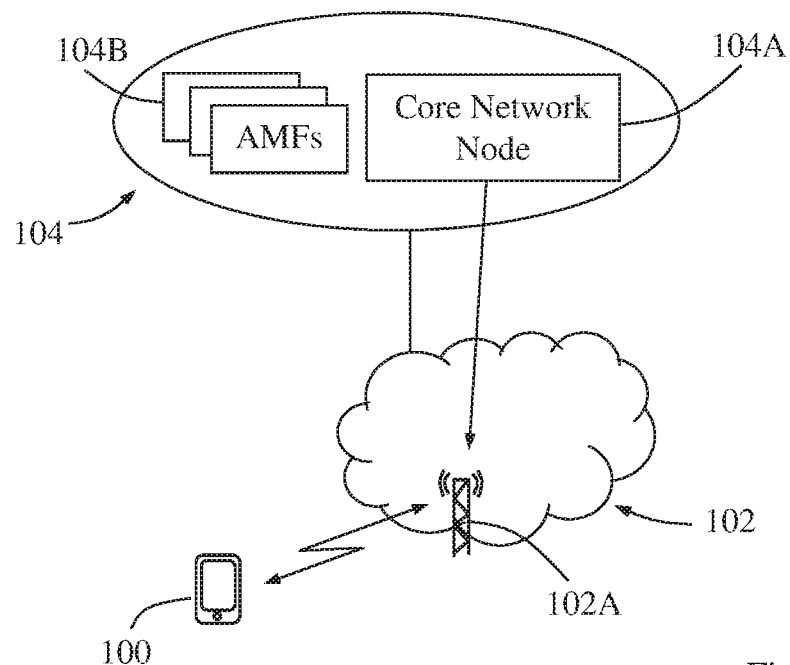
FIG. 1 is a communication scenario where the embodiments and examples herein may be employed, involving a core network node and a RAN node.

A communication scenario where the examples herein may be employed is illustrated in FIG. 1 involving a RAN node 102A of a RAN 102 and a UE or wireless device 100 which is served by the RAN node 102A by communicating over a radio link between the UE/wireless device 100 and the RAN node 102A. The RAN node 102A may without limitation be a base station, an eNB or a gNB, depending on the terminology used. The RAN 102 is connected to a core network 104 comprising a core network node 104A and a set of AMFs 104B. The AMFs 104B basically manage mobility of UEs between different RAN nodes or cells. Some of the AMFs 104B may support emergency services while other AMFs may not support emergency services.

Figure 2:
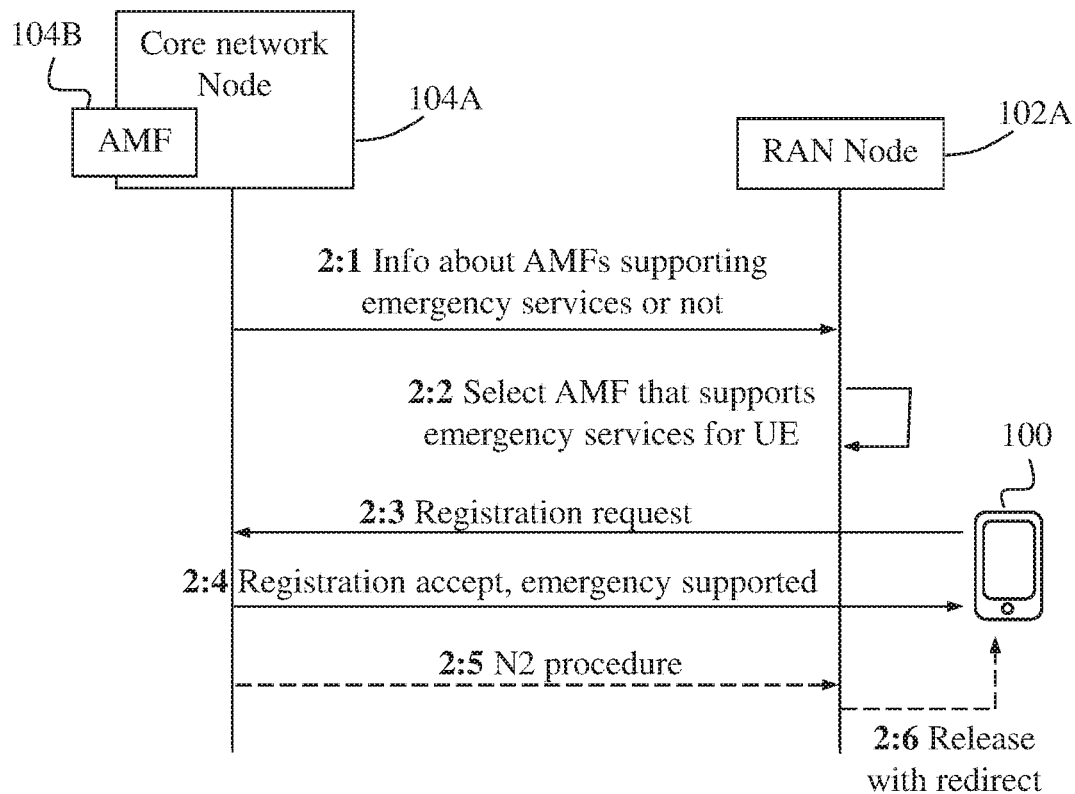
FIG. 2 is a signaling diagram illustrating an example of how a core network node and a RAN node may operate and interact, according to some possible embodiments.

The solution will now be described and explained in terms of functionality in a core network node of a core network and in a RAN node of a radio access network, respectively, which nodes are operable to enable emergency services for wireless devices in a RAN. FIG. 2 illustrates an example of a signalling scheme involving the core network node 104A, the RAN node 102A and a wireless device 100 where the numerals from FIG. 1 have been reused for corresponding entities.

In a first action 2:1, the core network node 104A sends, to the RAN node 102A, information about one or more Access and Mobility Management Functions, AMFs, that support emergency services, to avoid an emergency fallback procedure for wireless devices in the RAN. Hence, the RAN node 102A in this action receives, from the core network node 104A, said information about one or more AMFs that support emergency services, to avoid an emergency fallback procedure for the wireless devices. In a following action 2:2, the RAN node 102A then selects an AMF that supports emergency services for a wireless device 100 in the RAN, based on the received information.

Some optional further actions may be performed in this procedure as follows. In a further action 2:3, the core network node 104A obtains a registration request sent from the wireless device 100. Another action 2:4 illustrates that an AMF 104B of the core network node 104A serving the wireless device 100 sends a registration accept message to the wireless device 100, where it is indicated in the registration accept message that the core network supports emergency services.

Instead of action 2:4, an alternative action 2:5 may be that the AMF 104B of the core network node 104A trigger an N2 procedure towards the RAN, the N2 procedure including information about the core network to connect after release with redirect. As a result, the RAN node 102A includes said core network in a release with redirect command sent in an action 2:6 from the RAN node 102A towards the wireless device 100.

Figure 3:
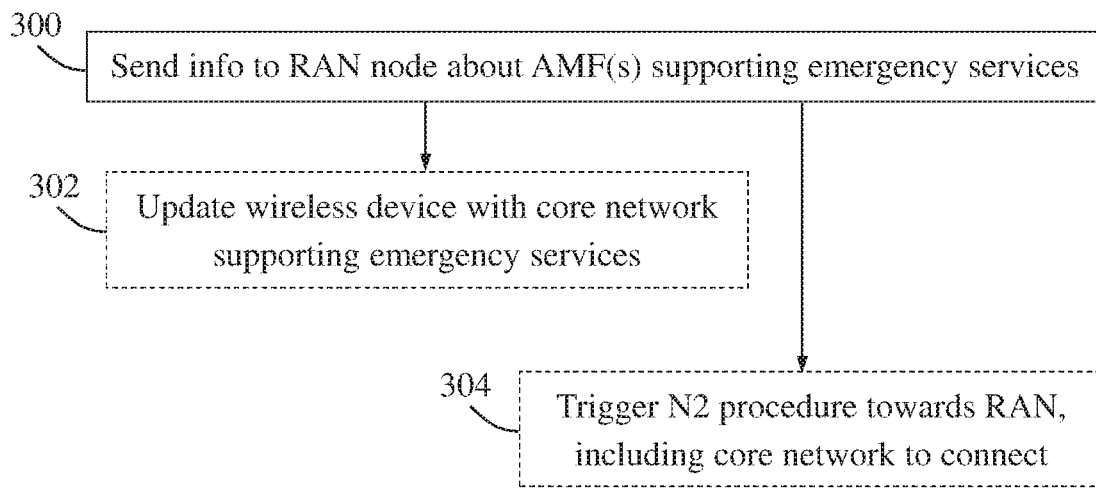
FIG. 3 is a flow chart illustrating a procedure in a core network node, according to further possible embodiments.

An example of how the solution may be employed in terms of actions performed by a core network node of a core network, such as the core network node 104A in FIGS. 1 and 2, is illustrated by the flow chart in FIG. 3 which will now be described with further reference to FIG. 2, although this procedure is not limited to the example of FIG. 2. FIG. 3 thus illustrates a procedure in a core network node 104A of a core network for enabling emergency services for wireless devices 100 in a radio access network, RAN. Some optional example embodiments that could be used in this procedure will also be described.

A first action 300 illustrates that the core network node 104A sends, to a node 102A in the RAN, information about one or more Access and Mobility Management Functions, AMFs, that support emergency services, to avoid an emergency fallback procedure for wireless devices in the RAN. This action corresponds to action 2:1 of FIG. 2. Thereby, the RAN node 102A is able to select an AMF that supports emergency services for a wireless device 100 in the RAN, based on the received information about the AMF(s) that support emergency services, as also shown in action 2:2 of FIG. 2. It should be noted that the wireless device 100 is mentioned as an example and the RAN node 102A may select an AMF in this manner for any number of wireless devices in the RAN.

A further action 302 illustrates that an AMF 104B of the core network node serving a wireless device may, in one alternative embodiment, update the wireless device 100 with the core network supporting emergency services in a registration accept message, which corresponds to action 2:4 of FIG. 2.

Another action 304 illustrates that an AMF 1048 of the core network node may, in another alternative example embodiment, trigger an N2 procedure towards the RAN, the N2 procedure including the core network to connect after release with redirect, so that the RAN node can include said core network in a release with redirect command towards a wireless device. This action corresponds to action 2:5 of FIG. 2 where an N2 procedure is triggered towards the RAN node 102A. In the N2 procedure, the RAN node 102A sends a release with redirect command to the wireless device 100 as shown in action 2:6 of FIG. 2. As mentioned above, N2 procedures are described in 3GPP TS 23.502, section 4.2.7.

Figure 4:
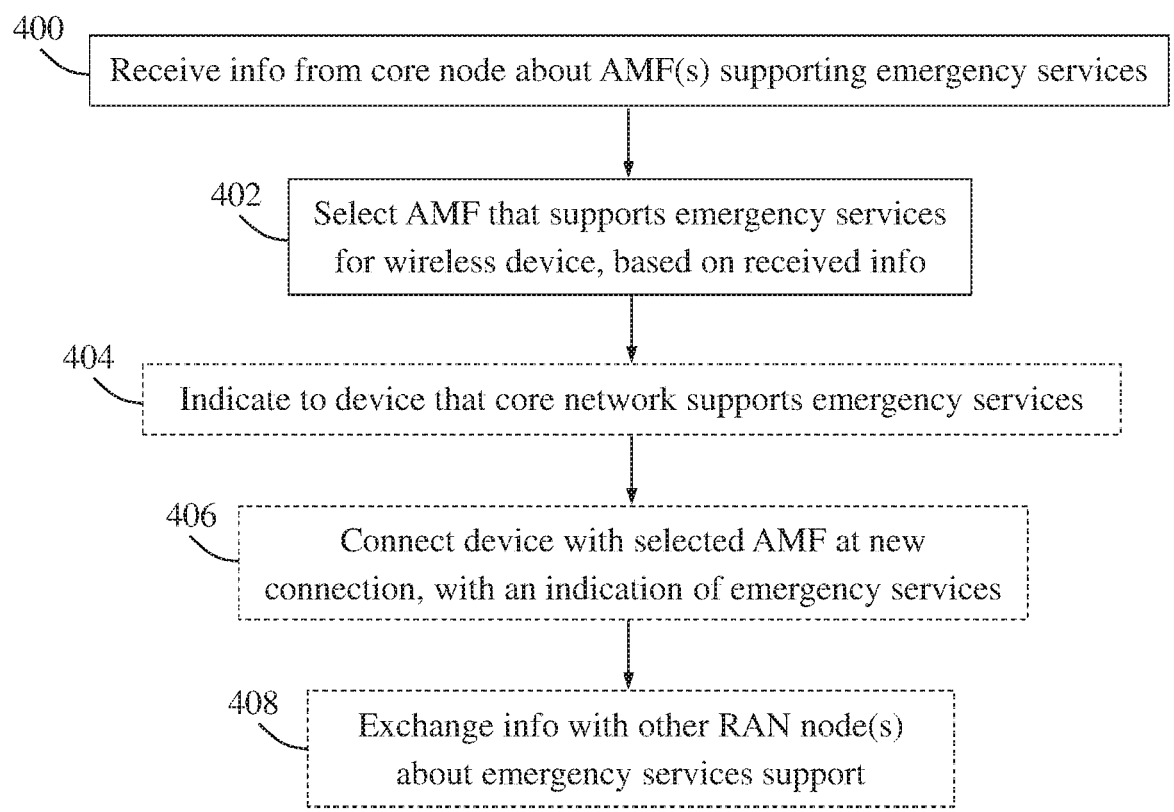
FIG. 4 is a flow chart illustrating a procedure in a RAN node, according to further possible embodiments.

Another example of how the solution may be employed in terms of actions performed by a node in a radio access network, RAN such as the RAN node 102A, is illustrated by the flow chart in FIG. 4 which will now be described likewise with further reference to FIG. 2, although this procedure is not limited to the example of FIG. 2. FIG. 4 thus illustrates a procedure in the RAN node 102A for enabling emergency services for wireless devices in the RAN. It should be noted that the actions in this figure can be executed in any suitable order and the procedure is thus not limited to the illustrated order.

A first action 400 illustrates that the RAN node 102A receives, from a core network node 104A of a core network, information about one or more Access and Mobility Management Functions, AMFs, that support emergency services, to avoid an emergency fallback procedure for the wireless devices. This action corresponds to action 2:1 of FIG. 2. In another action 402, the RAN node 102A further selects an AMF that supports emergency services for a wireless device 100 in the RAN, based on the received information. This action corresponds to action 2:2 of FIG. 2.

Some optional example embodiments and actions that could be used in this procedure will now also be described. In one example embodiment, the RAN node 102A may further indicate to the wireless device 100 that the core network supports emergency services, as shown in action 404. In another example embodiment, the RAN node 102A may in action 402 corresponding to action 2:2 select said AMF that supports emergency services further based on services requested by the wireless device.

In another example embodiment, the RAN node 102A may further connect the wireless device 100 with the selected AMF when the wireless device 100 sets up a new connection with an indication of emergency services, as shown in action 406.

In another example embodiment, the RAN node 102A may further exchange information with one or more other RAN nodes via X2 signalling, about whether they support emergency services or not, as shown in action 408.

Some further examples of how the above embodiments and actions may be implemented in practice, will now be described where a wireless device is denoted a UE for short.

Examples are proposed to make sure that the UE camps on the right core network after an emergency fall back, along with examples to avoid unnecessary emergency fall backs. Also, examples are proposed to optimize emergency fall back in areas with inconsistent support for emergency services.

Firstly, two examples will be outlined below, to enable the UE to camp on the right core network to avail emergency service, after the UE has been subjected to an emergency fall back based release with redirect to a RAN cell supporting multiple core networks. In this solution it has been realized that a potential problem with using release with redirect could be lack of information on whether a core network (CN) supports emergency services in case of multi core network support in a target RAN cell. If the UE is redirected for emergency purposes to a cell that only supports emergency services on one of the supported core network and not on the other core network(s), the UE might miss to camp on the right cell, leading to failure of emergency call setup. Either of the following two alternatives may be employed to handle this issue:

- The AMF updates the UE with the core network supporting emergency services in the registration accept message, corresponding to action 302 above. The UE would then use the core network information to camp on the right core network after it is released for emergency fall back, or
- the N2 procedure triggered by AMF towards RAN also includes the core network to connect after release with redirect, corresponding to action 304 above. The RAN can then include this information in the release with redirect command towards the UE.

Secondly, examples will be outlined below to avoid unnecessary fall back to a legacy radio access technology (RAT), such as LTE, UMTS or GSM, for emergency purposes. In this solution, the core network informs the RAN about the specific AMF's that support emergency services, as described for action 300 above. The emergency fallback to a target radio access node (RAN) can then be avoided by employing either of the following two alternatives:

- The UE is aware that the current AMF (i.e. the AMF on which the UE is camping) does not support emergency services as indicated in the Registration Accept message received from the current AMF. After receiving the registration accept message on Non Access Stratum (NAS), the UE is indicated by RAN that the core network supports Emergency services, corresponding to action 404 above. In case of emergency services, the UE will drop the connection and set up a new connection with an indication for Emergency services so that the RAN can connect the UE with the "right" AMF supporting emergency services. The RAN may in action 402 above select the AMF node in the core network further based on the services requested by the UE.
- The AMF node would trigger mobility as a response to a UE service request for emergency support. The RAN node/eNB would perform an internal handover of the UE, and then on reattach, the RAN node redirects the UE to the AMF supporting Emergency services. In case there is no AMF that supports Emergency services, RAN triggers emergency fallback towards a legacy RAT.

It may be a problem that the current AMF on which the UE is currently registered, i.e. camping, does not support emergency calls. In that case, the AMF node needs to be changed to a new specific node that supports emergency calls, within the same core network. Above, it has been described that the core network may inform the RAN node about a specific AMF (out of a group of AMF available to that RAN node) that supports emergency services.

Thirdly, examples are described to handle mobility meant for emergency fall back in case the support for emergency support is not consistent within a UE registration area. Currently in both LTE and NR, the RAN does not have knowledge of the support for emergency services at RAN and core network level for neighbour cells. System Information block is a broadcast information from the RAN node/eNB. Currently, the System Information block (SIB) does not contain information about the support for emergency services by core network, the SIB only report support for IMS emergency calls by RAN node.

To handle non-consistent support for emergency services, one possibility is that the core network updates the eNB about support for emergency services by a particular core network node/AMF, or the eNB can alternatively poll different AMF nodes within a core network to detect the support for emergency services by one of the AMF node in the core network. Once the eNB is aware about the core network support for emergency services, the eNB can broadcast this information in the SIB. The measurement objects should then be enhanced to configure the UE with reporting core network support for emergency services in the Inter RAT, IRAT, measurement reports. In this way, the eNB would be aware if the IRAT neighbor supports emergency services and it is suitable for triggering release with redirect and would be able in a better position to trigger the release with redirect towards the relevant IRAT cell.

X2 signaling is performed between two RAN nodes/eNB's. A UE or terminal always camps on a specific eNB (RAN network node) and also registers and camps on a specific AMF of a core network node. The SA2 group has proposed that the current RAN node (i.e. the RAN node that the UE is camping on) would trigger a release with redirect on the UE/terminal towards a neighbor RAN node.

But it may be a problem that the target RAN node might not support emergency calls as well. In another example, the support for emergency services could be indicated with neighbour cells via X2 signalling. Neighbour cells with X2 connectivity will then be aware about the support for emergency services and can then trigger an emergency fall back based release with redirect towards the right core network that supports emergency services.

It was mentioned above that a terminal always camps on a specific eNB (or RAN node) and also registers on a specific AMF (which is a core network node). In the examples herein, the emergency fall back procedure may be improved. Currently, the source RAN node is not aware about the neighbor RAN node's support for emergency services. SA2 group proposed that the current RAN node (RAN node that the UE is camping on) would trigger a release with redirect on the terminal towards a neighbor RAN node. But the problem is that the target RAN node might not support emergency calls as well. So, it is proposed that RAN nodes can inform each other via X2 signalling whether they support emergency services or not, making it easier for the RAN nodes (not supporting emergency service) to trigger release with redirect towards the right target RAN node (supporting emergency service).

Figure 5:
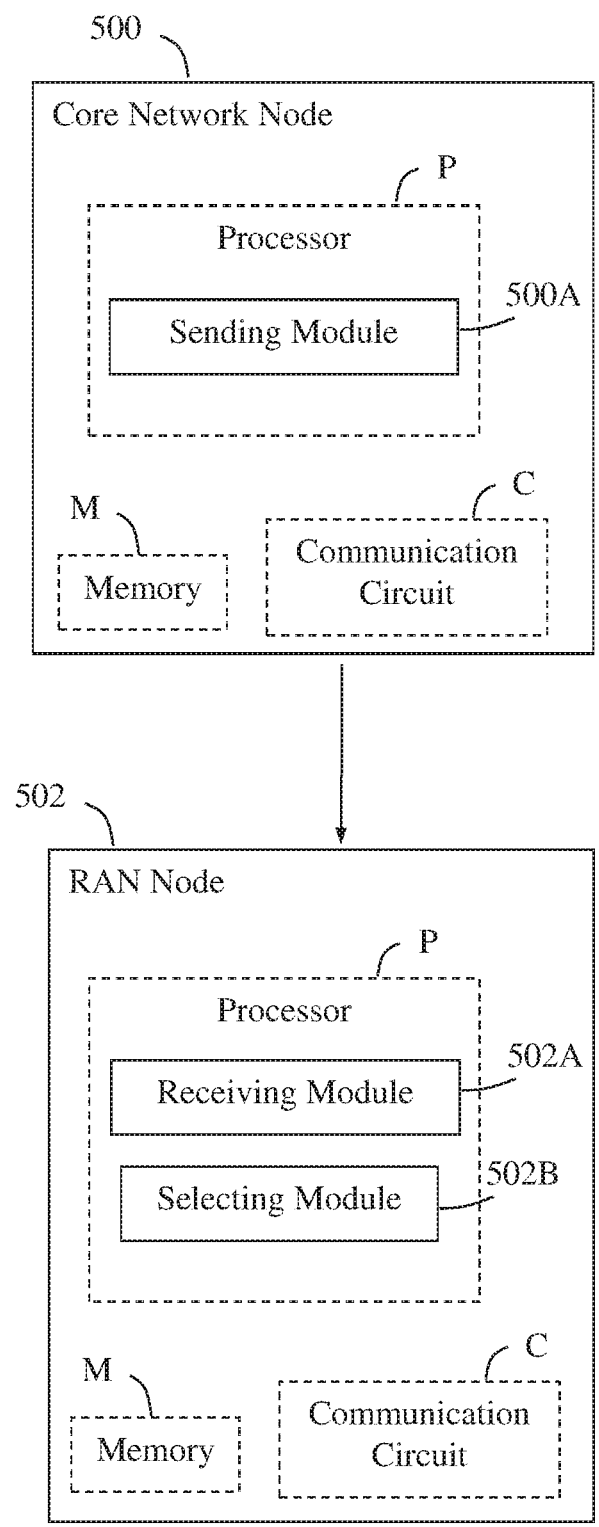
FIG. 5 is a block diagram illustrating how a core network node and a RAN node may be structured, according to further possible embodiments.

The block diagram in FIG. 5 illustrates a detailed but non-limiting example of how a core network node 500 and a RAN node 502, respectively, may be structured to bring about the above-described examples. In this figure, the core network node 500 and the RAN node 502 may be configured to operate according to any of the examples as described herein, where appropriate. For example, the core network node 500 and the RAN node 502 may be operable such as described above for the core network node 104A and the RAN node 102A, respectively, in FIG. 2. Each of the core network node 500 and the RAN node 502 is shown to comprise a processor "P", a memory "M" and a communication circuit "C" with suitable equipment for transmitting and receiving radio signals in the manner described herein.

The communication circuit C in each of the core network node 500 and the RAN node 502 thus comprises equipment configured for communication with each other using a suitable protocol for the communication depending on the implementation. The examples herein are however not limited to any specific types of messages or protocols.

When being part of a core network, the core network node 500 is arranged to enable emergency services for wireless devices in a radio access network, RAN. The core network node 500 is configured to send, to a node in the RAN, information about one or more Access and Mobility Management Functions, AMFs, that support emergency services, to avoid an emergency fallback procedure for the wireless devices. This operation may be performed by a sending module 500A in the core network node 500.

The RAN node 502 is arranged to enable emergency services for wireless devices in the RAN. The RAN node 502 is configured to receive, from a core network node 500 of a core network, information about one or more Access and Mobility Management Functions, AMFs, that support emergency services, to avoid an emergency fallback procedure for the wireless devices. This operation may be performed by a receiving module 502A in the RAN node 502. The RAN node 502 is also configured to select an AMF that supports emergency services for a wireless device in the RAN, not shown, based on the received information. This operation may be performed by a selecting module 502B in the RAN node 502.

It should be noted that FIG. 5 illustrates various functional modules in the core network node 500 and the RAN node 502, respectively, and the skilled person is able to implement these functional modules in practice using suitable software and hardware equipment. Thus, the examples herein are generally not limited to the shown structures of the core network node 500 and the RAN node 502, and the functional modules therein may be configured to operate according to any of the features, examples and situations described in this disclosure, where appropriate.

The functional modules 500A and 502A-B described above may be implemented in the core network node 500 and the RAN node 502, respectively, by means of program modules of a respective computer program comprising code means which, when run by the processor P causes the core network node 500 and the RAN node 502 to perform the above-described operations and procedures. Each processor P may comprise a single Central Processing Unit (CPU), or could comprise two or more processing units. For example, each processor P may include a general purpose microprocessor, an instruction set processor and/or related chips sets and/or a special purpose microprocessor such as an Application Specific Integrated Circuit (ASIC). Each processor P may also comprise a storage for caching purposes.

Each computer program may be carried by a computer program product in each of the core network node 500 and the RAN node 502 in the form of a memory having a computer readable medium and being connected to the processor P. The computer program product or memory M in each of the core network node 500 and the RAN node 502 thus comprises a computer readable medium on which the computer program is stored e.g. in the form of computer program modules or the like. For example, the memory M in each node may be a flash memory, a Random-Access Memory (RAM), a Read-Only Memory (ROM) or an Electrically Erasable Programmable ROM (EEPROM), and the program modules could in alternative examples be distributed on different computer program products in the form of memories within the respective core network node 500 and RAN node 502.

The examples described herein may be implemented in each of the core network node 500 and the RAN node 502 by a computer program comprising instructions which, when executed on at least one processor, cause the at least one processor to carry out the operations according to any of the above examples, where appropriate. The examples may also be implemented at each of the core network node 500 and the RAN node 502 in a carrier containing the above computer program, wherein the carrier is one of an electronic signal, optical signal, radio signal, or computer readable storage medium.

While the examples have been described with reference to specific practical situations, the description is generally only intended to illustrate how the above-mentioned problems might be avoided or at least reduced. For example, the terms "RAN node", "wireless device", "core network node", "AMF", and "emergency fallback procedure" have been used throughout this disclosure, although any other corresponding entities, functions, and/or parameters could also be used having the features and characteristics described here. The solution is defined by the appended claims.

The invention claimed is:

1. A method performed by a core network node of a core network, for enabling emergency services for wireless devices in a radio access network (RAN), the method comprising:
   generating a message for a radio access node in the RAN, the message indicating whether respective Access and Mobility Management Functions (AMFs) within a group of AMFs of the core network that are available to the radio access node support emergency services;
   sending the message to the radio access node, thereby informing the radio access node as to whether or which ones of the AMFs in the group of AMFs available to the radio access node support emergency services.

2. The method according to claim 1, wherein an AMF of the core network node serving a wireless device updates the wireless device with the core network supporting emergency services in a registration accept message.

3. The method according to claim 1, wherein an AMF of the core network node triggers an N2 procedure towards the RAN, the N2 procedure including that the core network connects after release with redirect, so that the RAN node can include the core network in a release with redirect command towards a wireless device.

4. A core network node of a core network, configured to enable emergency services for wireless devices in a radio access network (RAN), wherein the network node comprises:
   processing circuitry configured to:
   generate a message for a radio access node in the RAN, the message indicating whether respective Access and Mobility Management Functions (AMFs) within a group of AMFs of the core network that are available to the radio access node support emergency services;
   send the message to the radio access node, thereby informing the radio access node as to whether or which ones of the AMFs in the group of AMFs available to the radio access node support emergency services.

5. The core network node according to claim 4, wherein an AMF of the core network node serving a wireless device is configured to update the wireless device with the core network supporting emergency services in a registration accept message.

6. The core network node according to claim 4, wherein an AMF of the core network node is configured to trigger an N2 procedure towards the RAN, the N2 procedure including that the core network connects after release with redirect, so that the RAN node can include the core network in a release with redirect command towards a wireless device.

7. A method performed by a radio access node in a radio access network (RAN) for enabling emergency services for wireless devices in the RAN, the method comprising:
   receiving, from a core network node of a core network, a message indicating whether respective Access and Mobility Management Functions (AMFs) within a group of AMFs of the core network that are available to the radio access node support emergency services; and selecting one of the AMFs from the group that is indicated in the message as supporting emergency services.

8. The method according to claim 7, further comprising indicating to the wireless device that the core network supports emergency services.

9. The method according to claim 7, wherein selecting the one AMF is further based on services requested by the wireless device.

10. The method according to claim 7, further comprising connecting the wireless device with the selected AMF responsive to determining that the wireless device set up a new connection with an indication of emergency services.

11. The method according to claim 7, further comprising exchanging information with one or more other radio access nodes of the RAN via X2 signaling, about whether the other radio access nodes support emergency services or not.

12. A radio access node in a radio access network (RAN) configured to enable emergency services for wireless devices in the RAN, wherein the radio access node comprises:

processing circuitry configured to:
 receive, from a core network node of a core network, a message indicating whether respective Access and Mobility Management Functions (AMFs) within a group of AMFs of the core network that are available to the radio access node support emergency services; and
 select one of the AMFs from the group that is indicated in the message as supporting emergency services, for a wireless device in the RAN.

13. The radio access node according to claim 12, wherein the processing circuitry is configured to indicate to the wireless device that the core network supports emergency services.

14. The radio access node according to claim 12, wherein the processing circuitry is configured to select the one AMF further based on services requested by the wireless device.

15. The radio access node according to claim 12, wherein the processing circuitry is configured to connect the wireless device with the selected AMF responsive to determining that the wireless device set up a new connection with an indication of emergency services.

16. The radio access node according to claim 12, wherein the processing circuitry is configured to exchange information with one or more other radio access nodes via X2 signaling, about whether they support emergency services.

* * * * *